United States Patent [19]

Harada et al.

[11] Patent Number: 4,499,194

[45] Date of Patent: Feb. 12, 1985

[54] CARRIER FOR OLEFIN POLYMERIZATION CATALYSTS AND PROCESS FOR PRODUCING THE SAME

[75] Inventors: Masato Harada, Kisarazushi; Makoto Iijima; Noriaki Saitoh, both of Ichiharashi, all of Japan

[73] Assignee: Chisso Corporation, Osaka, Japan

[21] Appl. No.: 564,307

[22] Filed: Dec. 22, 1983

[30] Foreign Application Priority Data

Jan. 20, 1983 [JP] Japan .................................. 58-7849

[51] Int. Cl.$^3$ ......................... B01J 27/08; B01J 35/08
[52] U.S. Cl. ....................... 502/8; 502/226; 502/439
[58] Field of Search ............................ 502/8, 226, 439

[56] References Cited

U.S. PATENT DOCUMENTS 4,350,612 9/1982 Greco et al. ......................... 502/439
4,399,054 8/1983 Ferraris et al. ................. 502/439 X
4,399,055 8/1983 Mitsuura et al. ............... 502/439 X Primary Examiner—W. J. Shine
Attorney, Agent, or Firm—Fred Philpitt

[57] ABSTRACT

A carrier for olefin polymerization catalysts (or catalyst components) which is in spherical form and has a narrow particle size distribution is produced by reacting an anhydrous magnesium dihalide with an alcohol or a phenol in an inert organic solvent to obtain a complex compound; suspending this complex compound with vigorous stirring in the presence of a nonionic surfactant in an inert organic solvent at the melting point of the complex compound or higher; and adding an organoaluminum compound or a silicon halide to the suspension to react them to thereby form spherical solids.

6 Claims, No Drawings

CARRIER FOR OLEFIN POLYMERIZATION CATALYSTS AND PROCESS FOR PRODUCING THE SAME

BACKGROUND OF THE INVENTION

Field of the Invention

This invention relates to a carrier for olefin polymerization catalysts and a process for producing the same. More particularly it relates to a carrier for olefin polymerization catalysts, obtained by reacting suspended particles of a complex compound of an anhydrous magnesium chloride with an alcohol (or a phenol), with an organoaluminum compound or a silicon halide to form spherical solids, and a process for producing the same.

Ziegler-Natta type olefin polymerization catalysts comprise a transition metal catalyst component and a compound of metals of groups I~III of the Periodic Table, preferably an organometal compounds, as an activator. It has been known that if the former catalyst component is in solid form, various desirable effects can be exhibited by supporting this component on a specified carrier; for example, the yield of olefin polymers per unit weight of transition metal can be notably increased and also the bulk density of the polymers can be improved. In order to obtain such desirable effects, a carrier having a definite level or higher of surface area and pore volume, and also having a spherical form and a narrow particle size distribution of such spherical particles has come to be required. Such a form of carrier is difficult to obtain by milling, mill-burning or mill-burning reaction of solid carrier raw materials. The aimed carrier is also required to be able to retain such an extent of strength that the supported catalyst component cannot be crushed into fine powder or its spherical form cannot be lost at the catalyst preparation step and subsequent polymerization step. Because it is known that the form of the olefin polymer particles obtained in the olefin polymerization in the presence of Ziegler-Natta catalysts has an intimate correlationship with the form of solid transition metal catalyst components.

On the premise of the above-mentioned requirements, the following techniques for providing such spherical carriers have been proposed:

For example, there are the following processes ① and ② both of reacting an anhydrous magnesium dihalide with an alcohol and making the resulting complex compound spherical:

① A process of Japanese patent application laid-open No. Sho 55-135102/1980 wherein the complex compound is brought into a molten, suspended state in an organic solvent and the resulting compound is cooled down to a definite temperature in a very short time in the presence of a surfactant; and ② a process of Japanese patent application laid-open No. Sho 55-29591/1980 wherein a dispersant or a siloxane is used in place of the surfactant of the above-mentioned surfactant.

The extent of temperature reduction at the time of quenching in these proposals amounts to about 100° C. (note: a temperature difference between the melting temperature and the solidification temperature); hence to achieve such quenching is accompanied by a considerable technical difficulty and simple practice is difficult.

On the other hand, the following techniques ③ and ④ have been proposed wherein another reagent is further reacted with the complex compound of an anhydrous magnesium dihalide with an alcohol:

③ A process of Japanese patent publication No. Sho 50-32270/1975 or No. Sho 56-45403/1981 wherein an organoaluminum compound is reacted with the complex compound; and ④ a process of Japanese patent application laid-open Nos. Sho 49-72383/1974 or Sho 49-106581/1974 a silicon halide is reacted with the complex compound.

However, according to these proposed processes, no spherical carrier can be obtained and even if carriers obtained by the processes are used, no spherical solid catalyst component can be obtained, and also even if olefin polymerization is carried out using solid catalyst components obtained from the carriers, no spherical olefin polymer can be obtained.

The present inventors have made strenuous studies for solving the problems raised in the processes of the prior art for producing a spherical carrier for olefin polymerization catalysts, and as a result, have found that if a complex compound of an anhydrous magnesium dihalide with an alcohol (or a phenol) is suspended in an inert organic solvent at a temperature of its melting point or higher, and the resulting suspension is reacted with an organoaluminum compound or a silicon halide, then the suspended particles of the complex compound are converted into solids, and a spherical carrier having a narrow particle size distribution can be produced without quenching, and thus have completed the present invention.

As apparent from the foregoing, an object of the present invention is to provide a carrier for olefin polymerization catalysts (or catalyst components), which is in spherical form and has a narrow particle size distribution and also other physical properties, and a process for producing the same.

Another object of the present invention is to provide a catalyst component for olefin polymerization, produced using the above-mentioned carrier, and olefin polymers produced using this catalyst component.

SUMMARY OF THE INVENTION

The present invention has the following constitutions of two aspects:

(1) A carrier for olefin polymerization catalysts and a process for producing the same, which are characterized by reacting an anhydrous magnesium dihalide with at least one compound selected from the group consisting of alcohols and phenols in an inert organic solvent to obtain a complex compound;

suspending this complex compound with vigorous stirring in the presence of a nonionic surfactant in an inert organic solvent at a temperature of the melting point of the complex compound or higher; and adding an organoaluminum compound or a silicon halide to the suspension to react it with the suspension to thereby form spherical solids.

(2) A carrier and a process of the above item (1) wherein the reaction of said organoaluminum compound or silicon halide with said suspension is carried out in the presence of an electron donor.

(3) A carrier and a process of the above item (1) wherein the reaction of said organoaluminum compound or silicon halide with said suspension is carried out at a temperature of 90° to 150° C.

(4) A carrier and a process of the above item (1) wherein the stirring of said complex compound in an inert organic solvent is carried out at a strength of 0.8 to 1.7 K Watt per m³ of said suspension formed by the stirring.

DETAILED DESCRIPTION OF THE INVENTION

As the anhydrous magnesium halide used in the present invention, anhydrous magnesium chloride and anhydrous magnesium bromide may be used. As for the term "anhydrous", these compounds may contain a trace of water to a similar extent to that of commercially available products being sold as "anhydrous" magnesium chloride or bromide. As the alcohols used in the present invention, either of aliphatic or aromatic mono- or polyhydroxy alcohols may be used. Concrete examples of such alcohols are aliphatic alcohols such as methyl alcohol, ethyl alcohol, n-propyl alcohol, i-propyl alcohol, n-butyl alcohol, i-butyl alcohol, n-amyl alcohol, i-amyl alcohol, and allyl alcohol, cycloaliphatic alcohols such as cyclopentanol and cyclohexanol, and besides, polyhydroxy alcohols such as ethylene glycol, diethylene glycol, propylene glycol, pentanediol and glycerol. Particularly, aliphatic alcohols of 5 carbon atoms or less such as methyl alcohol, ethyl alcohol, n-propyl alcohol and i-butyl alcohol are preferably used. In place of or together with such alcohols, the following phenols may also be used: e.g. monovalent phenols such as phenol and cresol, or polyvalent phenols such as resorcin.

The inert organic solvent used in the present invention refers to solvents which are inert to the above-mentioned anhydrous magnesium dihalides, alcohols and phenols and further complex compounds formed by their reaction. Concrete examples are aliphatic hydrocarbons such as hexane, heptane, octane, nonane, decane and kerosene, aromatic hydrocarbons such as benzene, toluene, xylene, and cumene and halogenated hydrocarbons such as 1,2-dichloroethane, chlorobenzene and dichlorobenzene.

In the present invention, an anhydrous magnesium dihalide is reacted with an alcohol (or a phenol) in an inert organic solvent to form a complex compound thereof. The reaction conditions are as follows:

An alcohol is used in an amount of 1 to 15 mols, preferably 1 to 8 mols based on one mol of an anhydrous magnesium dihalide. Further, an electron donor as mentioned later may be added at the time of this reaction, and its amount added is in the range of 0.01 to 0.7 mmol, preferably 0.05 to 0.5 mmol based on one mol of the dihalide. The amount of the inert organic solvent used is in the range of 0.1 to 10 l, preferably 0.3 to 5 l, based on 10 g of the dihalide. As for the reaction temperature and time, the temperature used for forming the complex compound is not always limited, but it is preferred to keep the temperature in the range of 85° to 170° C., preferably 90° to 150° C., in order to rapidly carry out the formation reaction of the complex compound and successively suspend it in an inert organic solvent with vigorous stirring as described later while keeping it in molten state. If the temperature is lower than 85° C., the complex compound does not melt, while if it exceeds 170° C., the compound causes thermal decomposition. The reaction time including the reaction time of an organoaluminum compound (or silicon halide) with the complex compound (suspension) at the later stage is in the range of 10 minutes to 10 hours, preferably 20 minutes to 5 hours.

The complex compound thus formed is vigorously agitated in order to keep a desirable suspension state (in the form of melt) in an inert organic solvent, and also a nonionic surfactant is added. Stirring manner is not always specified, but for example, a stirrer provided with a rotor or an axial flow type stirrer may be applied. Further, for enhancing the stirring effect, a buffle may be provided in the reaction vessel. The strength of stirring is in the range of 0.8 to 1.7 KW per m³ of the reaction mixture liquid as expressed by power required. If the strength is less than 0.8 KW, the particle diameter of the suspended particles constituting the suspension state increases up to an undesirable extent, and the particle diameter distribution becomes broader, and also the particles take various forms other than spherical one. If the power exceeds 1.7 KW/m³, the particle diameter of the spherical suspended particles becomes so small that carrier having aimed particle diameter cannot be obtained and also the strength of the carrier lowers. The above-mentioned nonionic surfactant is not always specified but e.g. sorbitan fatty acid esters, polyoxyethylene sorbitan fatty acid esters and polyoxyethylene fatty acid esters may be preferably used. The surfactants have a purpose of well keeping the suspended state of the complex compound in an inert organic solvent to make smooth the reaction of the suspension as mentioned later. Thus, the time at which the surfactant is added may be after completion of the formation reaction of the complex compound. However, since the surfactant is inert to either of the anhydrous magnesium dihalides or alcohols (or phenols), it may be in advance added to the reaction mixture when the reaction of these starting raw materials is initiated. The amount of the surfactant added is in the range of 0.1 to 7 g, preferably 0.5 to 5 g, per 10 g of the anhydrous magnesium dihalide as a starting raw material, and its concentration in an inert organic solvent is in the range of 0.01 to 50 g/l, preferably 0.1 to 30 g/l. If the amount of the surfactant added is less than the above proportion or concentration, the size, form and particle diameter distribution of the suspended particles of the above-mentioned complex compound become unsuitable, while even if the added amount exceeds the above upper limits, no particular improvement in effectiveness is observed. The suspended particles of the complex compound in the reaction mixture vigorously agitated and having a nonionic surfactant added therein, as mentioned above, react with an organoaluminum compound (or silicon halide) added to the reaction mixture at the above reaction temperature (85° to 170° C.) and with continued stirring to form stable solid spherical particles.

As for the organoaluminum compounds used, those generally used as activators for Ziegler-Natta catalysts may be used. Concrete examples thereof are trialkylaluminums such as triethylaluminum, triisobutylaluminum, tri-n-hexylaluminum, etc., dialkylaluminum monohalides such as diethylaluminum chloride, di-n-butylaluminum chloride, etc., alkylaluminum dihalides such as ethylaluminum dichloride, butylaluminum dichloride, etc., and alkylaluminum sesquihalides such as ethylaluminum sesquichloride, butylaluminum sesquichloride, etc. Among them, triethylaluminum and diethylaluminum chloride are easily used and preferred.

Together with or in place of the organoaluminum compounds, the following silicon halides may also be used. Concrete examples thereof are silicon tetrahalides such as silicon tetrachloride, monoalkylsilicon trihalides such as methylsilicon trichloride, ethylsilicon trichloride, etc., and trialkylsilicon monohalides such as triethylsilicon monochloride. Silicon tetrachloride may be preferably used. The amount of the organoaluminum compounds or silicon halides used is in the range of 0.1 to 20 mols, preferably 1 to 10 mols, based on one mol of the anhydrous magnesium dihalides as a constituent raw material of the complex compound.

In the reaction of the suspension of the complex compound with the organoaluminum compounds (or silicon halides), an electron donor may also be used together therewith and this affords a desirable result as mentioned later.

The electron donor used is not always specified and those which can be used as the so-called third component in usual Ziegler-Natta catalysts or a modifier for solid transition metal compound catalyst components (excluding alcohols) may be simultaneously used in the reaction without any obstacle. Those which are conventionally used as such electron donor are low molecular weight organic compounds containing oxygen, sulfur, nitrogen or phosphorus, e.g. those disclosed in Japanese patent application laid-open No. Sho 56-120,712/1981.

In the process of the present invention, however, organic carboxylic acid esters are easily used and afford a preferred result. Examples thereof are fatty acid esters such as ethyl acetate, butyl acetate, etc., and aromatic carboxylic acid esters such as ethyl benzoate, methyl toluylate, ethyl anisate, etc. The effectiveness of the simultaneous use of the electron donor consists in that the catalyst in which the transition metal catalyst component prepared by using the carrier of the present invention is used, affords, when used as a catalyst for α-olefin polymerization, a superior stereoregular polymer. The amount of the electron donor used is in the range of 0.01 to 0.7 mol, preferably 0.05 to 0.5 mol, based on one mol of anhydrous magnesium dihalide as a constituent raw material of the complex. The electron donor used may be added at either time before, during or after the first reaction in the present invention, i.e. the reaction of anhydrous magnesium dihalide with alcohols (or phenols). In this case, it is presumed that there is formed a complex compound wherein not only alcohols (or phenols) but also an electron donor added together therewith are coordinated with anhydrous magnesium halide.

The conditions (temperature and time) of the second step reaction of the present invention i.e. the reaction of the suspension of the complex compound with an organoaluminum (or silicon halide) and optionally an electron donor, may be succeeded from the first step reaction conditions and unnecessary to be particularly altered. However, in the case of the second step reaction, the reaction temperature is to be kept constant during the reaction and also the above-mentioned vigorous stirring is to be kept till this step reaction is completed. The organoaluminum compound (or silicon halide) and the electron donor to be added at the second step may be diluted by an inert organic solvent in a ratio by volume of about 2 to 10 times the volume of the suspension of the first step reaction mixture and then added.

The second step reaction, which is carried out at a temperature of the melting temperature (85° C.) of the complex compound or higher, converts the suspended complex compound into spherical solids, and after completion of the reaction, this particulate form based on the suspended compound is unchanged even if the above-mentioned stirring is stopped while the reaction temperature is kept as it is. Thus, cooling or slowdown of the stirring force after completion of the reaction may be slowly carried out unlike the case of the above-mentioned prior art.

After completion of the reaction, the reaction mixture is separated by decantation into the inert organic solvent and spherical solids, followed by repeatedly washing the solids with an inert organic solvent, or separated by filtration in usual manner, followed by similarly washing with the solvent, to remove a component which is soluble in the solvent. The resulting solids may be then dried or sent to the subsequent step of producing the catalyst component in a slurry state, as it is. The thus obtained spherical solids have an average particle diameter in the range of 10 to 80 μm, a narrow particle size distribution and a superior resistance to fracture as mentioned later.

If the average particle diameter is less than 10 μm, the catalyst component prepared by using the spherical solids as carrier, also has a small particle diameter, and the polymer obtained by using the catalyst component also is in the form of fine powder having a very small particle diameter. Further the presence of such fine powder causes various troubles in the commercial production process of olefin polymers.

On the contrary, if the average particle diameter of the spherical solids exceeds 80 μm, the particle diameter of the supported catalyst component also becomes too large as compared with the above-mentioned case so that in the production of olefin polymers using the component, fracture of the solid catalyst component is liable to occur due to the polymer growth occurring on the solid catalyst surface. As a result, the olefin polymer thus obtained has an inferior form and also the particle size distribution becomes broader to an undesirable extent.

The spherical solids i.e. the carrier for polymerization catalyst of the present invention obtained according to the present invention has a surface area of 200 to 700 $m^2/g$ and a pore volume of 0.20 to 0.70 $cm^3/g$. In the case of similar carriers obtained according to processes outside the scope of the present invention and having a surface area and a pore volume less than the above-mentioned lower limit values, it is impossible for catalysts prepared using such carriers to have a sufficient polymerizability to such an extent that the step of deashing olefin polymers obtained by using the catalysts can be omitted. On the other hand, in the case of similar carriers having a surface area and a pore volume exceeding the above-mentioned upper limit values, the solid catalyst components prepared using the carriers have a reduced resistance to fracture, and it is impossible for catalysts prepared using such carriers to produce a polymer having a spherical form and a narrow particle size distribution, as the ultimate object of the present invention. The foregoing fact also applies to the cases where either one of the surface area or the pore volume of the spherical solids does not fall within the above-mentioned ranges.

Further, in the case where the raw material for the spherical solids of the present invention is obtained from the reaction of the complex compound (suspended particles) with an organoaluminum compound, the Cl/Mg (or Br/Mg) and Mg/Al, each an atomic ratio, of the resulting spherical solids (carrier) are in the range of 2.0 to 3.0 and in the range of 1.0 to 2.0, respectively. If either one or both of the atomic ratios are less than the above-mentioned lower limit values, it is difficult to keep the activity of the finally produced catalyst at a superior activity to such an extent that the step of deashing the polymer obtained using the catalyst can be omitted. On the other hand, if Cl/Mg (or Br/Mg) exceeds 3.0, the content of inferior quality halogen in the polymer similarly obtained increases to be liable to cause corrosion of molding machines for processing the polymer or thermal decomposition of the polymer at the time of processing. Further, if Mg/Al exceeds 2.0, there increases the amount of a super-high molecular weight substance such as fish eyes or a thermal decomposition substance contained in the olefin polymer obtained using the catalyst prepared using the carrier, to have a bad influence upon the quality of the polymer. As described above, the carrier of the present invention is preferred to satisfy the values of Cl/Mg (or Br/Mg) and Mg/Al in the above-mentioned ranges.

As to the relationship between the surface area and the pore volume and Cl/Mg (or Br/Mg) and Mg/Al of the carrier of the present invention, if any of these is in the above-mentioned ranges of numeral values, aimed results are obtained, but if either one of the numeral values is outside the above ranges, no desirable results can be obtained. Namely all of the elements are preferred to satisfy the above-mentioned numerical values in the ranges.

A solid catalyst component obtained by reacting a transition metal compound with the carrier of the present invention obtained above is combined with an organometal compound whose metal belongs to groups I to III of the Periodic Table to obtain an olefin polymerization catalyst. Examples of olefins for olefin polymerization using the above catalyst are linear monoolefins such as ethylene, propylene, butene-1, hexene-1 and octene-1, branched monoolefins such as 4-methyl-pentene-1, and diolefins such as butadiene. By using the above catalyst using the carrier of the present invention, it is possible to subject these olefins to not only homopolymerization but also block copolymerization or random copolymerization.

As for the polymerization manner employed in these polymerizations, not only slurry polymerization but also either of bulk polymerization or gas phase polymerization may be carried out. The polymerization temperature used is in the range of 40° to 250° C., preferably 50° to 170° C., and the polymerization pressure is in the range of 3 Kg/cm$^2$G, preferably 5 to 40 Kg/cm$^2$G. In the polymerization, a small amount of hydrogen may be added to the polymerization mixture to control the molecular weight of the resulting polymer through its amount used. Further, in the polymerization of α-olefins of 3 carbon atoms or more, an electron donor selected from the above-mentioned organic compounds containing oxygen, nitrogen or phosphorus may be used to control the stereoregularity of the resulting polymer.

The characteristic effectiveness of the process of the present invention consists in that a carrier for olefin polymerization catalysts, having a spherical form, a narrow particle size distribution and a superior resistance to fracture can be easily produced according to a simplified process. Namely, according to a simple process of reacting an organoaluminum compound or a silicon halide with a complex compound of an anhydrous magnesium dihalide with an alcohol (or a phenol), suspended in an inert organic solvent in molten state, it is possible to convert the suspended particles into solids while the reaction temperature is maintained; hence quenching process is unnecessary by which a large amount of heat should be removed within a short period of time. Further, the equipments for producing this carrier can be applied, as it is, to the process of reacting the carrier of the present invention with a transition metal compound to obtain a catalyst component for olefin polymerization; hence as a whole it is possible to simplify the equipments or process for producing the carrier and the catalyst component.

On the other hand, the characteristic effectiveness of the carrier of the present invention consists in that the solid catalyst component produced using this carrier is spherical and superior in the resistance to fracture. As a result, when olefins are polymerized using a catalyst consisting of a combination of the component with an organometal compound, it is possible to obtain polymer particles which are spherical, narrow in the particle diameter distribution and difficult to freacture (difficult to form fine powder).

The present invention will be further described by way of Examples. The surface area and pore volume of the carriers obtained in Examples were measured by Accusorb 2100-01 type manufactured by Micromeritics Instrument Co.

EXAMPLE 1

(1) Production of Carrier

Into a 2 l capacity vessel type reactor provide with an axial flow type stirrer, sufficiently purged with purified nitrogen gas were placed purified kerosene (0.6 l), anhydrous magnesium chloride (19 g), ethanol (60 ml), ethyl benzoate (5 g) and sorbitan distearate (5 g), and the mixture was heated in nitrogen atmosphere under normal pressures, at 110° C. for 30 minutes, with stirring (the number of revolutions: 7,000 rpm), using 1.2 KW · per m$^3$ of suspension as a power required for the stirring, to form a complex compound suspended in the form of transparent or translucent molten spherical particles. A kerosene solution (5 l) containing diethylaluminum chloride (60 g) was gradually added thereto over 30 minutes to form white, opaque, spherical solids (carrier), followed by stirring at the same temperature for additional 30 minutes, filtering at 90° C. and sufficiently washing with n-heptane at 90° C. The resulting carrier particles had the following properties:

spherical form (as observed by an optical microscope); particles having diameters of 10 to 50 μm occupied 88% by weight of the total particles; average particle diameter, 26 μm; surface area, 310 m$^2$/g; pore volume, 0.35 cm$^3$/g; and Cl/Mg therein (atomic ratio), 2.3 and Mg/Al (atomic ratio), 1.5. The carrier powder was placed and pressed between two glass plates in nitrogen atmosphere, and found to be difficult to fracture.

(2) Preparation of solid catalyst component

Into a 1 l glass flask sufficiently purged with purified nitrogen gas were placed purified kerosene (0.3 l) and the carrier obtained in the above step (1) (10 g), followed by adding TiCl$_4$ (50 ml) over 10 minutes while keeping the temperature at 5° C., heating the mixture for reaction at 20° C. for 30 minutes and further at 90° C. for 2 hours, twice washing with TiCl$_4$ (50 ml) and washing with n-heptane. The resulting carrier after such reaction and washing was then suspended in purified n-heptane (0.3 l), followed by adding ethyl benzoate (1 g), reacting the mixture at 70° C. for one hour, twice washing with heptane (50 ml) at 70° C., suspending it in TiCl$_4$ (100 ml), reacting at 90° C. for 2 hours, once washing with TiCl$_4$ (50 ml) at 90° C., and twice washing with heptane (50 ml) at 70° C. to obtain a solid catalyst component, which contained 35 mg of Ti atom and 115 mg of ethyl benzoate in 1 g of the component and had a spherical particulate form.

(3) Propylene polymerization

A 2 l autoclave was sufficiently dried by purified nitrogen gas, three times washed with purified n-hexane (1 l), heated to 100° C. and dried in vacuo for 2 hours and returned to normal pressures with propylene. Into this autoclave were placed purified hexane (1 l), triethylaluminum (2.0 mmols), methyl p-toluylate (0.50 mmol) and the solid catalyst component obtained in the above step (2) (20 mg), in propylene atmosphere, followed by stirring at normal temperatures for 10 minutes under a propylene partial pressure of 1 Kg/cm$^2$G, raising the temperature up to 55° C., adding hydrogen gas (100 N ml), and continuously feeding propylene so as to give a total pressure of 6 Kg/cm$^2$G to carry out polymerization at 60° C. for one hour. After the polymerization, the resulting slurry was filtered to obtain white polymer powder (64.0 g). The amount of hexane-soluble matters in the polymerization was 1.8 g. The polymer powder had a spherical or nearly spherical form, an apparent density of 0.38 g/cm$^3$ and a percentage boiling heptane extraction residue of 97.2%. The average particle diameter of the polymer was 320 μm; the amount of polymers having a particle diameter of 210 to 500 μm occupied 85% by weight of the total polymers; and the proportion of particles having particle diameters of 100 μm or less was only 1.5% by weight.

COMPARATIVE EXAMPLE 1

A carrier was produced as in Example 1 except that no sorbitan distearate was used in Example 1 (1). Most of the resulting carrier particles were amorphous; the amount of nearly spherical particles was small; the particle diameter distribution was broad; thus the particles were unsuitable as catalyst carrier.

COMPARATIVE EXAMPLE 2

A carrier was produced as in Example 1 (1) except that the power required for the stirring in Example 1 (1) was changed to 0.4 KW (number of revolutions: 500 rpm). The resulting carrier particles had various forms ranging from nearly spherical one to amorphous one, and the average particle diameter was as large as 45 μm; hence the particles were unsuitable as catalyst carrier.

COMPARATIVE EXAMPLE 3

A carrier was produced as in Example 1 except that the power required for the stirring in Example 1 (1) was changed to 2.0 KW (number of revolutions: 15,000 rpm). The resulting carrier particles were spherical, but the average particle diameter was 7 μm and particles having particle diameters of 10 to 50 μm occupied 40% by weight of the total particles; hence such particles were too small to be suitable as catalyst carrier.

COMPARATIVE EXAMPLE 4

A carrier was produced as in Example 1 except that the reaction temperature of the complex compound and diethylaluminum monochloride in Example 1 (1) was changed to 70° C. The resulting carrier particles were amorphous and large; hence they were unsuitable as catalyst carrier.

COMPARATIVE EXAMPLE 5

A carrier was produced as in Example 1 except that the reaction temperature of the complex compound and diethylaluminum monochloride in Example 1 (1) was changed to 200° C. The resulting carrier had various forms ranging from nearly spherical one to amorphous one. Using this carrier, preparation of solid catalyst and propylene polymerization were carried out as in Example 1 (2) and (3). The amount of the resulting polymer powder was 30 g and most of the powder was amorphous; hence the powder was utterly unsuitable as catalyst carrier.

EXAMPLE 2

A carrier was produced as in Example 1 (1) except that the power required for the stirring in Example 1 (1) was changed to 0.8 KW (number of revolutions: 1,000 rpm). The resulting carrier was spherical or nearly spherical; particles having particle diameters of 10 μm to 50 μm occupied 90% by weight of the total particles; the average particle diameter, 30 μm; the surface area, 250 m$^2$/g; the pore volume, 0.31 cm$^3$/g; and Cl/Mg in the carrier, 2.2, and Mg/Al therein, 1.6. The carrier powder was difficult to fracture; hence it was suitable as catalyst carrier.

EXAMPLE 3

A carrier was produced as in Example 1 except that the power required for the stirring in Example 1 (1) was changed to 1.6 KW (number of revolutions: 9,500 rpm). The resulting carrier was spherical; particles having particle diameters of 10 to 50 μm, 86% by weight; average particle diameter, 19 μm; surface are, 350 m$^2$/g; pore volume, 0.40 cm$^3$/g; and Cl/Mg in the carrier, 2.4 and Mg/Al therein, 1.6. The carrier powder was difficult to fracture; hence it was suitable as catalyst carrier.

EXAMPLE 4

(1) Production of carrier

A carrier was produced as in Example 1 (1) except that i-butanol (110 ml) and triethylaluminum (57 g) were used in place of ethanol and diethylaluminum monochloride in Example 1, respectively, and 1.5 KW (number of revolutions: 10,000 rpm) as a power required for the stirring was used in place of 1.2 KW (number of revolutions: 7,000). The resulting carrier was spherical; particles having particle diameters of 10 to 50 μm occupied 84% by weight of the total particles; average particle diameter, 20 μm; surface area, 280 m$^2$/g; pore volume, 0.38 cm$^3$/g; and Cl/Mg in the carrier, 2.5 and Mg/Cl therein, 1.7. The carrier particles were difficult to fracture.

(2) Preparation of solid catalyst component

Example 1 was repeated except that the carrier obtained in Example 4 (1) was used in place of the carrier used in Example 1. The particles of the resulting catalyst component was spherical.

(3) Propylene polymerization

Propylene polymerization was carried out as in Example 1 except that the solid catalyst component obtained in Example 4 (2) (20 mg) was used in place of the solid catalyst component obtained in Example 1. A white polymer (60 g) was obtained; the polymer was spherical or nearly spherical; its average particle diameter was 290 μm; and particles having particle diameters of 210 to 500 μm occupied 82% by weight of the total particles and the proportion of particles having particle diameters of 100 μm or less was only 2.0% by weight of the total particles.

EXAMPLE 5

A carrier was produced as in Example 1 (1) except that purified decane (0.6 l) was used in place of purified kerosene; i-propyl alcohol (77 ml) was used in place of ethanol; methyl p-toluylate (3 g) was used in place of ethyl benzoate; and the amount of sorbitan distearate used was 3 g in place of 5 g. The resulting carrier was spherical; particles of 10 to 50 μm occupied 80% by weight of the total particles; average particle diameter, 18 μm; surface area, 300 m$^2$/g; pore volume, 0.40 cm$^3$/g; and Cl/Mg in the carrier, 2.1 and Mg/Al therein, 1.8. The carrier powder was difficult to fracture; thus it was suitable as carrier for catalyst component.

EXAMPLE 6

(1) Production of carrier

A carrier was produced as in Example 1 (1) except that no ethyl benzoate was used and SiCl$_4$ (50 g) was used in place of diethylaluminum chloride. The carrier was spherical or nearly spherical; particles having particle diameters of 10 to 50 μm occupied 83% by weight of the total particles; average particle diameter, 19 μm; surface area, 230 m$^2$/g; pore volume, 0.42 cm$^3$/g; and Cl/Mg in the carrier, 2.7. The carrier was difficult to fracture.

(2) Preparation of solid catalyst component

Purified heptane (0.4 l) and the carrier (10 g) obtained in the above step (1) were placed in a 1 l glass flask, followed by adding TiCl$_4$ (50 ml) at room temperature over 10 minutes, reacting them on heating at 90° C. for 2 hours, repeatedly washing the resulting material with heptane at 70° C. till no unreacted TiCl$_4$ was detected in the filtrate, to obtain a solid catalyst component, which contained 20 mg of Ti atom in 1 g of the component and was spherical or nearly spherical. All of these operations were carried out in the atmosphere of purified nitrogen gas.

(3) Ethylene polymerization

Ethylene polymerization was carried out using the solid catalyst obtained in the above step (2). Into a 2 l autoclave sufficiently purged with purified nitrogen gas were placed purified hexane (1 l), triethylaluminum (1.0 mmol) and the solid catalyst component of the step (2) (20 mg), followed by adding hydrogen under 1.5 Kg/cm$^2$G at 75° C., continuously feeding ethylene so as to give an ethylene partial pressure of 3 Kg/cm$^2$G and a total pressure of 5.5 Kg/cm$^2$G at 80° C. to carry out polymerization for one hour. After the polymerization, the resulting slurry was filtered to obtain white polymer powder (67 g). The polymer was spherical or nearly spherical; apparent density, 0.35 g/cm$^3$; average particle diameter, 320 μm; and the proportion of fine polymer particles having particle diameters of 100 μm or less was 2.5% by weight of the total particles.

What we claim is:

1. A carrier for olefin polymerization catalysts obtained by:
    reacting an anhydrous magnesium dihalide with at least one compound selected from the group consisting of alcohols and phenols in an inert organic solvent to obtain a complex compound;
    suspending this complex compound with vigorous stirring in the presence of a nonionic surfactant in an inert organic solvent at a temperature of the melting point of the complex compound or higher; and
    adding an organoaluminum compound or a silicon halide to the suspension to react it at 90°–150° C. with the suspension to thereby form spherical solids.

2. A carrier of claim 1 wherein the reaction of said organoaluminum compound or silicon halide with said suspension is carried out in the presence of an electron donor.

3. A carrier of claim 1 wherein the stirring of said complex compound in an inert organic solvent is carried out at a strength of 0.8 to 1.7 K Watt per m$^3$ of said suspension formed by the stirring.

4. A process for producing a carrier for olefin polymerization catalysts, which comprises
    reacting an anhydrous magnesium dihalide with at least one compound selected from the group consisting of alcohols and phenols in an inert organic solvent to obtain a complex compound;
    suspending this complex compound with vigorous stirring in the presence of a nonionic surfactant in an inert organic solvent at a temperature of the melting point of the complex compound or higher; and
    adding an organoaluminum compound or a silicon halide to the suspension to react it at 90°–150° C. with the suspension to thereby form spherical solids.

5. A process of claim 4 wherein the reaction of said organoaluminum compound or silicon halide with said suspension is carried out in the presence of an electron donor.

6. A process of claim 4 wherein the stirring of said complex compound in an inert organic solvent is carried out at a strength of 0.8 to 1.7 K Watt per m$^3$ of said suspension formed by the stirring.

* * * * *